United States Patent
Kim et al.

(10) Patent No.: US 11,416,932 B2
(45) Date of Patent: Aug. 16, 2022

(54) VIRTUAL CURRENCY TRANSACTION SYSTEM

(71) Applicant: NEO FRAME INC, Seoul (KR)

(72) Inventors: Sungryong Kim, Seoul (KR); Gooyoung Jung, Seoul (KR); Byungcheon Lee, Seoul (KR)

(73) Assignee: NEO FRAME INC, Seoul (KR)

( * ) Notice: Subject to any disclaimer, the term of this patent is extended or adjusted under 35 U.S.C. 154(b) by 78 days.

(21) Appl. No.: 16/712,992

(22) Filed: Dec. 13, 2019

(65) Prior Publication Data

US 2020/0265517 A1    Aug. 20, 2020

(30) Foreign Application Priority Data

Feb. 20, 2019   (KR) .................. 10-2019-0019709

(51) Int. Cl.
  *G06Q 40/04*   (2012.01)
  *G06Q 20/38*   (2012.01)

(52) U.S. Cl.
  CPC .......... *G06Q 40/04* (2013.01); *G06Q 20/381* (2013.01)

(58) Field of Classification Search
  CPC .............................. G06Q 40/04; G06Q 20/381
  USPC ........................................................ 705/37
  See application file for complete search history.

(56) References Cited

U.S. PATENT DOCUMENTS

| 11,164,167 | B2 * | 11/2021 | Young | G06Q 20/3278 |
| 2007/0203725 | A1 * | 8/2007 | Jung | G06Q 40/02 705/39 |
| 2007/0203817 | A1 * | 8/2007 | Jung | G06Q 40/00 705/35 |
| 2008/0133392 | A1 * | 6/2008 | Jung | G06Q 40/02 705/35 |

FOREIGN PATENT DOCUMENTS

| KR | 10-2005-0072548 A | 7/2005 |
| KR | 10-2014-0115611 A | 10/2014 |
| KR | 10-2015-0142757 A | 12/2015 |
| KR | 10-2016-0016336 A | 2/2016 |
| KR | 10-1694455 B1 | 1/2017 |
| KR | 10-2017-0065380 A | 6/2017 |

(Continued)

*Primary Examiner* — Lindsay M Maguire
(74) *Attorney, Agent, or Firm* — Park, Kim & Suh, LLC

(57) ABSTRACT

Disclosed is a virtual currency transaction system. The virtual currency transaction system according to an embodiment of the inventive concept includes a virtual currency integration exchange server receiving buying request information and selling request information of virtual currency, matching the buying request information and the selling request information, which are suitable for a transaction condition, based on asking price information to make a transaction of virtual currency, and recording transaction conclusion information for each virtual currency transaction and a broker member server transmitting buying request information and selling request information, which are transmitted from a user terminal, to the virtual currency integration exchange server and receiving the asking price information and the transaction conclusion information from (Continued)

the virtual currency integration exchange server to provide the asking price information and the transaction conclusion information to the user terminal.

1 Claim, 4 Drawing Sheets

(56) References Cited

FOREIGN PATENT DOCUMENTS

| KR | 10-2018-0104989 A | 9/2018 |
|----|-------------------|--------|
| WO | 2015/135018 A1 | 9/2015 |
| WO | 2019/027264 A1 | 2/2019 |

* cited by examiner

VIRTUAL CURRENCY TRANSACTION SYSTEM

CROSS-REFERENCE TO RELATED APPLICATIONS

A claim for priority under 35 U.S.C. § 119 is made to Korean Patent Application No. 10-2019-0019709 filed on Feb. 20, 2019, in the Korean Intellectual Property Office, the entire contents of which are hereby incorporated by reference.

BACKGROUND

Embodiments of the inventive concept described herein relate to a virtual currency transaction system.

The blockchain-based digital virtual currency has been recently used in online transactions; various kinds of virtual currency with different characteristics are used depending on a mining method, a value proof method and a transaction purpose; for example, there is Bitcoin, Ethereum, Ripple, or the like.

Unlike the conventional fiat currency transaction, the above-mentioned transaction of virtual currency is made by a peer-to-peer (P2P) network-based distributed database without central authority or a bank by applying a blockchain technology; a transaction history is shared and kept with all network participants; and all transaction participants may identify the whole transaction history.

However, the current buying and selling of virtual currency are done by opening an account through a virtual currency exchange and trading cash and the corresponding virtual currency, rather than directly and individually making the transaction between buyers and sellers.

However, unlike the structure of the stock market where brokerage transactions are made by a plurality of securities firms under the control that there is a single stock exchange, there may be a number of virtual currency exchanges and only the transaction between users who open an account in the corresponding virtual currency exchange may be made for each specific virtual currency exchange in the current virtual currency transaction method. Accordingly, the transaction of virtual currency may not be efficient.

SUMMARY

Embodiments of the inventive concept provide a virtual currency transaction system that may secure the diversity of virtual currency transactions through virtual currency transactions between different virtual currency transaction exchanges and may intervene in the entire transactions by introducing a virtual currency integration exchange that integrally manages a plurality of virtual currency transaction exchanges, thereby ensuring the completeness of a transaction.

Embodiments of the inventive concept provide a liquidation deposit system that may ensure the fulfillment of a payment between a virtual currency integration exchange and a plurality of virtual currency transaction exchanges (a plurality of member companies) and may allow virtual currency transactions capable of being trusted by a user employing the virtual currency transaction system to be made, and a virtual currency transaction system including a preliminary liquidation system.

The technical problem to be solved by embodiments of the inventive concept is not limited to the above-described technical problems, and other technical problems may be deduced.

According to an exemplary embodiment, a virtual currency transaction system includes a virtual currency integration exchange server receiving buying request information and selling request information of virtual currency, matching the buying request information and the selling request information, which are suitable for a transaction condition, based on asking price information to make a transaction of virtual currency, and recording transaction conclusion information for each virtual currency transaction and a broker member server transmitting buying request information and selling request information, which are transmitted from a user terminal, to the virtual currency integration exchange server and receiving the asking price information and the transaction conclusion information from the virtual currency integration exchange server to provide the asking price information and the transaction conclusion information to the user terminal. A first required period of a payment process between the broker member server and the user terminal is different from a second required period of a liquidation process between the virtual currency integration exchange server and the broker member server.

Furthermore, the broker member server is provided as a plurality of broker member servers. The payment process is a procedure in which the broker member server receives the transaction conclusion information of a corresponding transaction and deposit/withdrawal of a cash account and a virtual currency account is made between the user terminal and the broker member server based on the transaction conclusion information after the virtual currency integration exchange server makes the transaction of virtual currency. The liquidation process is a procedure in which the virtual currency integration exchange server collects total transaction conclusion information, deducts a bond and a debt for each of the plurality of broker member servers, and confirms the bond and the debt and thus a deposit/withdrawal of a cash account and a virtual currency account between the virtual currency integration exchange server and a respective broker member server is made based on the confirmed bond and the confirmed debt.

Moreover, the first required period of the payment process is longer than the second required period of the liquidation process.

Also, the first required period of the payment process is a day on which the corresponding transaction is made. The second required period of the liquidation process is a next day of the date on which the corresponding transaction is made.

In addition, the virtual currency integration exchange server stores information about a liquidation deposit deposited for each of the plurality of broker member servers so as to ensure fulfillment of the liquidation process. The liquidation process is performed in a manner of subtracting the bond and the debt confirmed for each of the broker member servers from the liquidation deposit.

Furthermore, the liquidation deposit includes a default deposit and a variable deposit. The default deposit is determined based on a predetermined condition for fiat currency or at least one or more types of virtual currency. The variable deposit is determined based on an average amount of deductions for each virtual currency type during a predetermined period. The average amount of deductions is a value obtained by subtracting an average buying amount from an average selling amount during the predetermined period of a corresponding virtual currency type.

Moreover, the virtual currency integration exchange server detects a liquidation risk situation based on the buying request information and the selling request information and transmits a preliminary liquidation notification signal to the broker member server in a case of the liquidation risk situation.

Also, the liquidation risk situation includes a case where a result of analyzing the buying request information and the selling request information indicates that a difference between a buying amount and a selling amount exceeds a predetermined level. The broker member server proceeds with the payment process between the broker member server and the user terminal after completing the liquidation process between the virtual currency integration exchange server and the broker member server first, when the broker member server transmits a preliminary liquidation request signal to the virtual currency integration exchange server in response to the preliminary liquidation notification signal.

According to an exemplary embodiment, a virtual currency integration exchange server includes a conclusion information management unit receiving buying request information and selling request information, which are transmitted from a user terminal to a broker member server, from the broker member server, matching the buying request information and the selling request information, which are suitable for a transaction condition, based on asking price information, and generating and recording transaction conclusion information based on the matching and a server communication unit transmitting the transaction conclusion information to the broker member server linked to the matched buying request information and selling request information, over a network interconnected to the broker member server, a deposit management unit determining a liquidation deposit so as to ensure fulfillment of a liquidation process and storing information about a liquidation deposit deposited by each of a plurality of broker member servers for each virtual currency type, and a liquidation process execution unit collecting the transaction conclusion information for all the plurality of broker member servers to conform a bond and a debt by deducting the bond and the debt and processing deposit/withdrawal of a cash account and a virtual currency account between the virtual currency integration exchange server and a respective broker member server based on the confirmed bond and the confirmed debt. A first required period of a payment process that is a deposit/withdrawal procedure based on the transaction conclusion information between the broker member server and the user terminal is different from a second required period of a liquidation process between the virtual currency integration exchange server and the broker member server.

Furthermore, the virtual currency integration exchange server according to an embodiment of the inventive concept further includes a liquidation risk control unit detecting a liquidation risk situation based on the buying request information and the selling request information of virtual currency received from the plurality of broker member servers and transmitting a preliminary liquidation notification signal to a corresponding broker member server when the liquidation risk situation is detected. The liquidation process execution unit completes the liquidation process between the virtual currency integration exchange server and the broker member server first before the payment process between the broker member server and the user terminal is performed, when the broker member server transmits a preliminary liquidation request signal to the liquidation risk control unit in response to the preliminary liquidation notification signal.

The above-mentioned means for solving the problems is only exemplary and should not be construed as limiting the inventive concept. In addition to the above-described exemplary embodiments, additional embodiments may be present in the drawings and detailed description of the invention.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
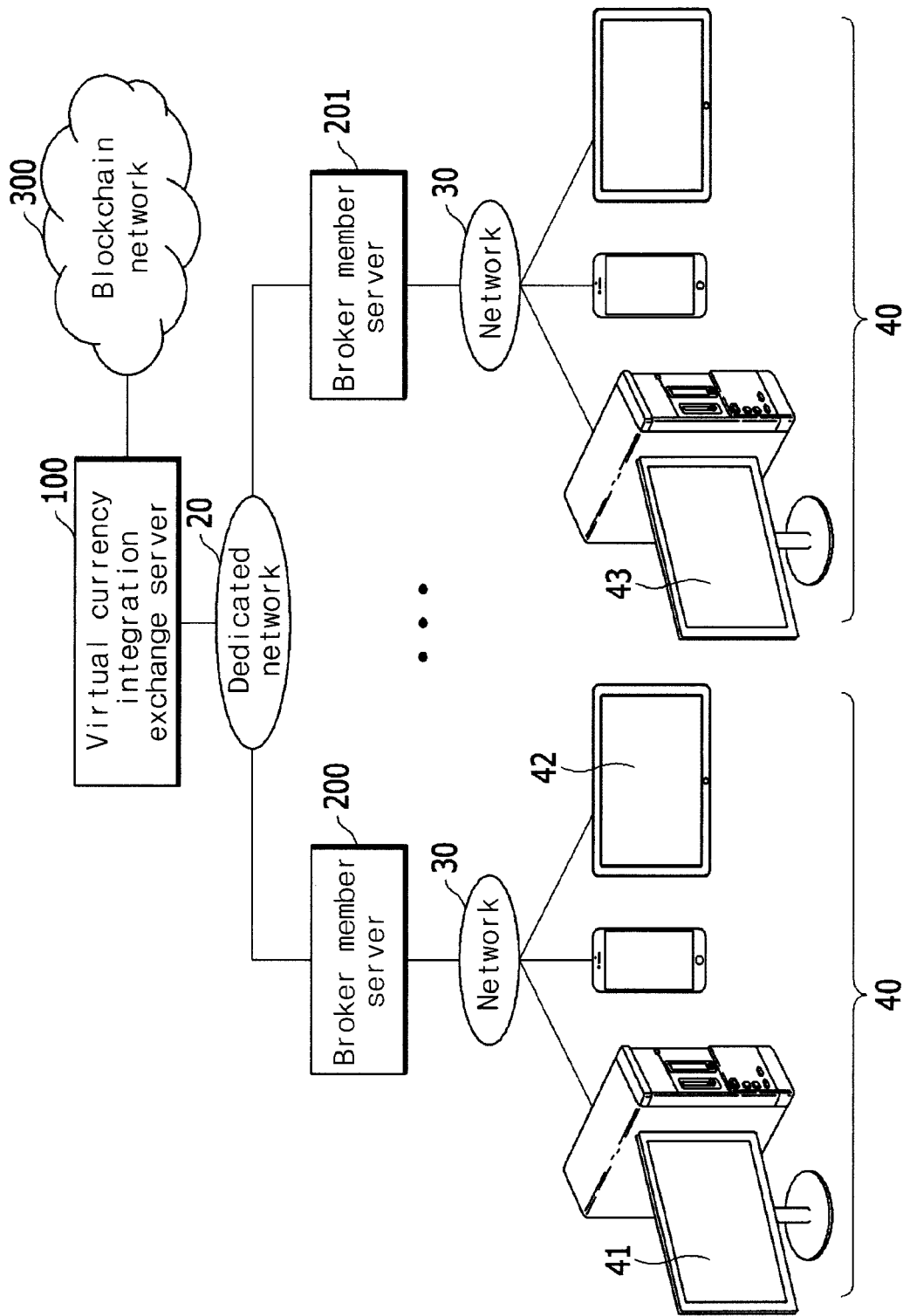
FIG. 1 is a diagram illustrating the configuration of a virtual currency transaction system, according to an embodiment of the inventive concept.

Hereinafter, embodiments of the inventive concept will be described in detail with reference to the accompanying drawings such that those skilled in the art may easily implement the inventive concept. However, the inventive concept may be embodied in different forms and may not be limited to the embodiments set forth herein. Moreover, in the drawings, portions irrelevant to the description are omitted to clearly describe the inventive concept, and similar reference numerals is assigned to similar portions throughout the specification.

Throughout this specification, when it is supposed that a portion is "connected" to another portion, this includes not only "directly connected" but also "electrically connected" or "indirectly connected" to other elements in between.

Throughout this specification, when it is supposed that a member is located on another member "on", "in an upper portion", "at an upper end", "under", "in a lower portion", "at a lower end", this includes not only the case where one member is in contact with another member but also the case where another member is present between two other members.

Throughout the specification, when a portion "comprises" a component, it means that it can further include other component, without excluding other components unless specifically stated otherwise.

FIG. 1 is a diagram illustrating the configuration of a virtual currency transaction system, according to an embodiment of the inventive concept.

Referring to FIG. 1, a virtual currency transaction system 10 may include a virtual currency integration exchange server 100 and a broker member server 200. For example, the plurality of broker member servers 200 may be provided.

The virtual currency integration exchange server 100 may receive buying request information and selling request information of virtual currency from the broker member server 200 and may make the transaction of the virtual currency by matching the buying request information and the selling request information that are matched with a transaction condition based on asking price information.

Furthermore, according to an embodiment of the inventive concept, the virtual currency integration exchange server 100 may make internal and external transactions. The internal transaction may be the transaction between user terminals associated with the same broker member server, and the external transaction may be the transaction between user terminals, which are respectively associated with different broker member servers.

Referring to FIG. 1, the transaction (e.g., a transaction between a user terminal 41 and a user terminal 42) between user terminals, which are associated with a single broker member server 200, is associated with the same broker member server 200, and thus may be the internal transaction. On the other hand, the transaction (e.g., the transaction between the user terminal 41 and a user terminal 43, which are associated with another broker member server 201) between user terminals, which is respectively associated with different broker member servers 200 and 201, may be the external transaction.

Furthermore, with regard to the internal transaction and the external transaction, according to an embodiment of the inventive concept, the virtual currency integration exchange server 100 may preferentially match the conclusion of the internal transaction among pieces of buying request information and pieces of selling request information. In detail, the virtual currency integration exchange server 100 may receive the identifier of each of the broker member servers 200 from the plurality of broker member servers 200 together with the buying request information and the selling request information. The virtual currency integration exchange server 100 may preferentially match the buying request information and the selling request information, which are associated with the same broker member server, based on the identifier for each broker member server.

Furthermore, according to an embodiment of the inventive concept, the virtual currency integration exchange server 100 may record transaction conclusion information for each virtual currency transaction.

According to an embodiment of the inventive concept, the virtual currency integration exchange server 100 may collect transaction conclusion information for each virtual currency transaction to transmit the collected transaction conclusion information to a blockchain network 300 and then may allow virtual currency changes in each of the broker member servers 200 to be updated. At this time, the transaction conclusion information for each virtual currency transaction may include a type of virtual currency being the target of a transaction, the matched buying request information and the matched selling request information, withdrawal details, and deposit details.

Moreover, according to an embodiment of the inventive concept, the virtual currency integration exchange server 100 may bundle transaction conclusion information for each of the broker member servers 200 and may transmit the bundled transaction conclusion information to the blockchain network.

The details about the blockchain network 300 are obvious to those skilled in the art, and thus detailed descriptions thereof will be omitted.

Furthermore, the virtual currency integration exchange server 100 may transmit asking price information and transaction conclusion information to the broker member server 200.

The broker member server 200 may provide a system through which existing or new customers transact virtual currency and manage the assets of customers.

For example, the broker member server 200 may be a financial institution server or a separate server connected to the financial institution server. The broker member server 200 may provide customers with an account for cash and an account for virtual currency, and a customer may buy the virtual currency in cash through the deposit of cash and virtual currency or may cash out through the withdrawal of virtual currency. In the deposit and withdrawal of cash, when the broker member server 200 is a financial institution server, the account of the financial institution server may be used; when the broker member server 200 is not a financial institution server, the cash account may be managed through the interlock with a financial institution or the separate deposit and withdrawal.

Moreover, according to an embodiment of the inventive concept, the broker member server 200 may be a platform member broker member server or an exchange member broker member server.

The platform member broker member server may use the same system or platform as the virtual currency integration exchange server 100 with respect to the ledger, investment information, and channel for the virtual currency transaction.

The exchange member broker member server may be an institutional finance or another virtual currency exchange; while using the system of the exchange member broker member server with respect to the ledger for a virtual currency transaction, the exchange member broker member server may use the same method as the virtual currency integration exchange server with respect to only the matching module for sharing asking price between broker member servers.

The broker member server 200 may transmit the buying request information and the selling request information transmitted from a user terminal 40, to the virtual currency integration exchange server 100.

Also, the broker member server 200 may receive the asking price information and the transaction conclusion information from the virtual currency integration exchange server 100 and provide the user terminal 40 with the asking price information and the transaction conclusion information.

According to an embodiment of the inventive concept, the virtual currency integration exchange server 100 and the broker member server 200 may communicate with each other over a dedicated network 20 interconnected to each other. The dedicated network 20 may mean a dedicated communication line between the virtual currency integration exchange server 100 and the broker member server 200 and may include, for example, the communication channel encrypted through VPN. Because the dedicated network 20 is not connected to the general Internet network, the dedicated network 20 may prevent the risk of invading the virtual currency account or the virtual currency wallet address from the outside. The dedicated network 20 may be configured such that each of the plurality of broker member servers 200 is independently connected to the virtual currency integration exchange server 100. For example, the dedicated network 20 may monitor the connection status of the communication line, using heart beat communication. In more detail, the communication between the virtual currency integration exchange server 100 and the broker member server 200 is performed via a dedicated line or the communication channel encrypted through VPN for security; whether the broker member server 200 is a normal broker device is identified through the login process; the connection status of the communication line is identified through heart beat. A communication packet is implemented in the form of transaction processing through the protocol definition for communication, and is divided into market data in broadcast form and transaction data such as buying, selling, closing, and the like. The broadcast messages may use multicast packets and transaction data may be transmitted or received through a specific port using TCP sessions.

Moreover, according to an embodiment of the inventive concept, price information, asking price information, buying request information, selling request information, transaction conclusion information, withdrawal transaction details and deposit details, which are exchanged between the virtual currency integration exchange server 100 and the broker member server 200 may be transmitted and received in the form of a broadcast message composed of communication packets, which is implemented in the form of transaction processing through the protocol definition for communication.

The user terminal 40 may be linked to the broker member server 200 and may be a subject that transacts virtual currency through the broker member server 200. For example, the user terminal 40 may be any kind of wireless communication device such as a smartphone, a smartpad, a tablet PC, and a terminal for a personal communication system (PCS), a global system for mobile communication (GSM), a personal digital cellular (PDC), a personal handyphone system (PHS), a personal digital assistant (PDA), International Mobile Telecommunication (IMT)-2000, a code division multiple access (CDMA)-2000, W-Code Division Multiple Access (W-CDMA), and Wireless Broadband Internet terminal (Wibro).

The user terminal 40 and the broker member server 200 may communicate over a network 30; the network 30 may refer to a wired and wireless connection structure in which information is exchanged between nodes such as a terminal and a server; for example, the network may include, but is not limited to, 3rd Generation Partnership Project (3GPP) network, Long Term Evolution (LTE) network, 5G network, a World Interoperability for Microwave Access (WIMAX) network, Internet, Local Area Network (LAN), Wireless Local Area Network (Wireless LAN), Wide Area Network (WAN), Personal Area Network (PAN), Bluetooth network, satellite broadcasting network, analog broadcasting network, and Digital Multimedia Broadcasting (DMB) network.

Moreover, according to an embodiment of the inventive concept, the broker member server 200 may manage the ledger in which deposit/withdrawal details of the virtual currency of cash and virtual currency accounts for the respective user terminal 40 associated with the broker member server 200 are recorded. For example, the broker member server 200 may manage the deposit/withdrawal of the cash and virtual currency accounts associated with the user terminal 40. When the transaction of virtual currency is made, the possession details of cash and virtual currency accounts may be changed. The broker member server 200 may monitor the change in possession details of virtual currency and may update the ledger, in which deposit/withdrawal details of the virtual currency are recorded, based on the transaction of the virtual currency.

Moreover, according to an embodiment of the inventive concept, the broker member server 200 may receive at least one of buying request information and selling request information from the user terminal 40. In addition, the broker member server 200 may control the dedicated network communication 20 with the virtual currency integration exchange server 100. In detail, the broker member server 200 may receive the trading price information (marketing information, asking price) of the virtual currency in a predetermined format from the virtual currency integration exchange server 100 through the channel of the dedicated network 20 and may transmit buying request information or selling request information in the predetermined format through another channel of the dedicated network 20. In the dedicated network 20, the security and rapidity may be improved by separately setting and using the transmission/reception channel of price information and the transmission/reception channel of trading information.

Figure 2:
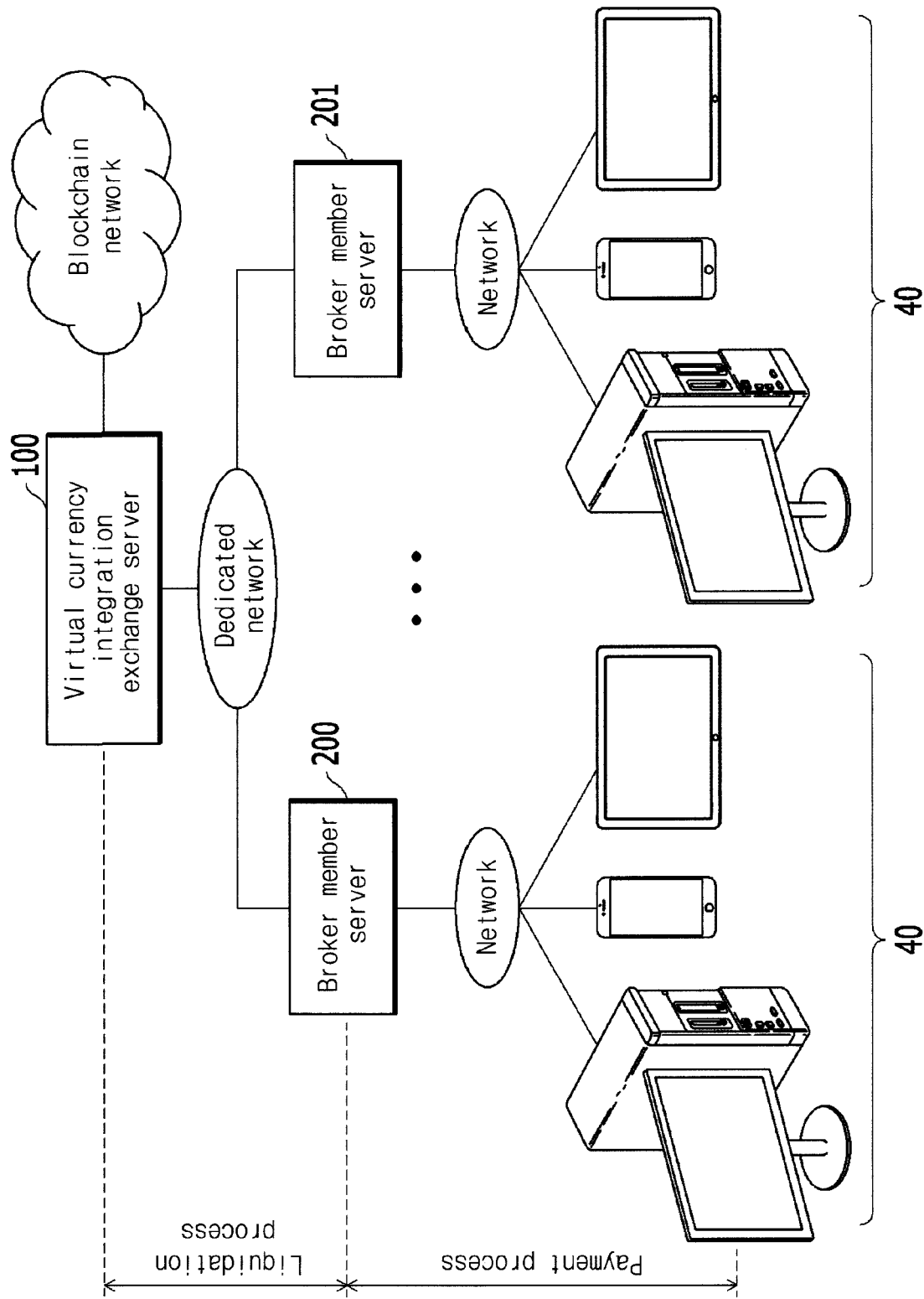
FIG. 2 is a view for describing a liquidation process and a payment process, according to an embodiment of the inventive concept.

FIG. 2 is a view for describing a liquidation process and a payment process, according to an embodiment of the inventive concept.

Referring to FIG. 2, a payment process may mean a procedure in which the broker member servers 200 and 201 receives the transaction conclusion information of the corresponding transaction and the deposit/withdrawal of cash and virtual currency accounts is made between the user terminal 40 and the broker member servers 200 and 201 based on the transaction conclusion information after the virtual currency integration exchange server 100 makes a transaction of virtual currency.

For example, the payment process may mean a process in which the broker member servers 200 and 201 change the possession details of the cash account and virtual currency account of a buyer and a seller participating in the transaction concluded by the virtual currency integration exchange server 100. At this time, the broker member servers 200 and 201 may deliver the virtual currency by the extent to which the transaction is made from a virtual currency owned by the broker member servers 200 and 201, to a user terminal corresponding to the buyer based on the transaction conclusion information and may receive the payment from the cash account of the buyer; the broker member servers 200 and 201 may receive the virtual currency by the extent to which the transaction is made, in the user terminal corresponding to the seller based on the transaction conclusion information, may add the virtual currency to the virtual currency owned by the broker member server 200, and may make a payment to the cash account of the seller.

At this time, when the total amount of virtual currency owned by broker member servers 200 and 201 is not sufficient to deliver the virtual currency by the extent to which the transaction is made, to the user terminal corresponding to the buyer, the broker member servers 200 and 201 may request the virtual currency integration exchange server 100 to borrow the corresponding virtual currency.

Also, the liquidation process may mean a procedure in which the virtual currency integration exchange server 100 may collect the total transaction conclusion information, may deduct bonds and debts for each of the broker member servers 200 and 201, and may confirm the bonds and debts and thus the deposit/withdrawal of cash and virtual currency accounts between the virtual currency integration exchange server 100 and the respective broker member servers 200 and 201 may be made based on the confirmed bonds and debts.

Moreover, according to an embodiment of the inventive concept, the liquidation process may mean a series of procedures; in the procedures, the virtual currency integration exchange server 100 intervenes in all virtual currency transactions between all user terminals linked to the plurality of broker member servers 200 and 201; the virtual currency integration exchange server 100 becomes a buyer for all sellers and becomes a seller for all buyers; the virtual currency integration exchange server 100 deducts bonds and debts for each of the broker member servers to confirm the bonds and debts and guarantees payment fulfillment.

Moreover, according to an embodiment of the inventive concept, the first required period of the payment process between the broker member servers 200 and 201 and the user terminal 40 may be different from the second required period of the liquidation process between the virtual currency integration exchange server 100 and the broker member server 200.

According to an embodiment of the inventive concept, when the concluded transaction is the internal transaction, in the payment process, the virtual currency and cash may be transferred immediately from the virtual currency account and the cash account, which are owned by broker member servers 200 and 201, to the user terminal 40 associated with the broker member servers 200 and 201 of the customer participating in the transaction.

Moreover, according to an embodiment of the inventive concept, when the external transaction between user terminals associated with the different broker member servers 200 and 201 is made, in the payment process, the virtual currency and cash may be immediately transferred from the virtual currency and cash owned by each broker member server to the user terminal of the customer participating in the transaction, prior to exchanging the virtual currency or cash corresponding to the transaction with another broker member server.

That is, when the concluded transaction is the internal transaction and, when the concluded transaction is the external transaction, the required period of the payment process may be the same first required period.

In particular, the bond and debt between different broker member servers in the payment process for the external transaction may be performed by the virtual currency integration exchange server 100 intervening in the liquidation process.

That is, it is desirable that the payment process is completed as soon as possible after the transaction is made such that the cash equivalent of a transaction or the delivery of a virtual currency is made quickly by the broker member server 200, after the transaction of virtual currency is made in the user terminal corresponding to the buyer or seller such that the case where the conclusion of the transaction is completed based on the buying request information and selling request information but there is an unpredictable problem and the exchange between real cash and virtual currency is not made, the case where the buyer first deposits the charge but does not receive the corresponding virtual currency, or the case where the seller first delivers the virtual currency but does not receive the charge may not be prevented.

Moreover, according to an embodiment of the inventive concept, the first required period of the payment process may be longer than the second required period of the liquidation process.

As described above, unlike the payment process where it is desirable to complete the transaction as soon as possible after a transaction conclusion, because the liquidation process between the virtual currency integration exchange server 100 and the plurality of broker member servers 200 requires a process of collecting the transaction conclusion information of all the internal transactions and all the external transactions concluded during a specific period of time and conforming the bond and debt to be settled between the plurality of broker member servers 200, the second required period of the liquidation process may be set to be longer than the first required period of the payment process.

Moreover, according to an embodiment of the inventive concept, for example, the first required period of the payment process may be the day on which the corresponding transaction is made; in this case, the second required period of the liquidation process may be the next day of the date on which the corresponding transaction is made.

That is, a seller and a buyer who participate in the virtual currency transaction may receive cash and virtual currency corresponding to the transaction within the day on which the transaction is made, regardless of whether the transaction is the internal transaction or the external transaction; the virtual currency integration exchange server 100 may liquidate the confirmed bond and debt with respect to each of the plurality of broker member servers 200 on the next day on which the transaction is made, in consideration of the entire transactions made during a day.

As described above, the payment process and the liquidation process are performed with a time lag, and thus the virtual currency integration exchange server 100 needs to have a means to ensure the fulfillment of the debt that each of the plurality of broker member servers 200 will fulfill in the liquidation process.

In other words, the virtual currency integration exchange server 100 needs to control and prevent payment failure or unforeseen accidents that may occur due to the time difference between the first required period being the required period of the payment process and the second required period being the required period of the liquidation process, such that a user (customer) employing the virtual currency transaction system 10 of the inventive concept makes a reliable virtual currency transaction.

In this regard, the virtual currency integration exchange server 100 may store information about a liquidation deposit deposited for each of the plurality of broker member servers so as to ensure the fulfillment of the liquidation process.

In detail, the liquidation deposit may function to avoid the possibility that the debt for the virtual currency integration exchange server 100 of the single broker member server 200 occurring by the payment process between the broker member server 200 and the user terminal 40 or the debt for other broker member server 201 is not fulfilled within the liquidation process performed later than the payment process.

That is, the virtual currency integration exchange server 100 may ensure the fulfillment of a benefit in return to ensure the completeness of the transaction by intervening in the occurring entire transactions and may depositing liquidation deposits for each broker member server; the buyer or seller participating in the transaction has no risk of receiving payment or the delivery of virtual currency, and thus the reliable virtual currency transaction system may be provided.

The virtual currency integration exchange server 100 may determine the liquidation deposit for the respective broker member servers 200 and 201; the liquidation deposit may be determined for each type of virtual currency (e.g., Bitcoin, Ethereum, Ripple, or the like) that is the target of the transaction. The type of virtual currency may include virtual currency, a token, a coin, or the like, which is newly issued or is generated, as well as entire virtual currencies that are currently traded on the market.

Moreover, according to an embodiment of the inventive concept, the liquidation deposit may be determined in units of at least one of fiat currency or virtual currency.

When the virtual currency to be delivered to the user terminal 40 during the payment process exceeds the total amount of virtual currency owned by the broker member servers 200 and 201, the broker member servers 200 and 201 that deposits the liquidation deposit in the virtual currency integration exchange server 100 may request the virtual currency integration exchange server 100 to borrow the corresponding kind of virtual currency from the liquidation deposit by a shortfall.

Moreover, according to an embodiment of the inventive concept, when the corresponding kind of virtual currency is already present in the liquidation deposit deposited by the broker member servers 200 and 201 that make a request for the borrowing of virtual currency, the virtual currency integration exchange server 100 may provide the virtual currency corresponding to the shortfall and may subtract the provided amount by the liquidation deposit.

At this time, while providing the broker member servers 200 and 201 with the shortage of virtual currency, the virtual currency integration exchange server 100 may receive a borrowing fee.

As described above, the broker member server that receives the shortage of virtual currency from the liquidation deposit in advance deposited in the virtual currency integration exchange server 100 may complete the payment process with the user terminal making a request for the purchase, using the liquidation deposit.

On the other hand, when the corresponding kind of virtual currency is not present in the liquidation deposit deposited by the broker member servers 200 and 201 making a request for the borrowing of the virtual currency or is less than the requested amount, the virtual currency corresponding to the shortage may be provided first and the corresponding virtual currency or cash corresponding to the provided amount may be received in the procedure of the liquidation process, which is to be performed later.

Also, the liquidation process may be performed in the manner of subtracting the bond and debt confirmed for each of the broker member servers from the liquidation deposit.

In addition, the liquidation deposit may include a default deposit and a variable deposit.

Furthermore, the default deposit may be determined based on the predetermined condition for fiat currency or at least one or more types of virtual currency.

For example, the default deposit may be determined at different levels with respect to the respective broker member server and the respective virtual currency type based on the number of subscribing customers (the number of associated user terminals) held by the respective broker member server 200 and the amount of transactions between the virtual currency integration exchange server 100 and the respective broker member servers 200 and 201; the default deposit may be calculated in units of currency using fiat currency or major virtual currency (e.g., Bitcoin, Ethereum, Aliance Platform token, or the like) with a large amount of transactions.

Also, the variable deposit may be determined based on the average amount of deductions for each virtual currency type during a predetermined period.

In addition, the average amount of deductions may be determined as a value obtained by subtracting the average buying amount from the average selling amount during the predetermined period of the corresponding virtual currency type.

According to an embodiment of the inventive concept, the variable deposit may be determined in units of the corresponding virtual currency so as to correspond to the amount that is 10% of the average amount of deductions under the condition that the predetermined period is three months.

For example, when the value obtained by subtracting the average buying amount from the average selling amount increases during the predetermined period, because the value of one unit of the corresponding virtual currency decreases during a predetermined period, the respective broker member server 200 may determine that more virtual currency than the existing virtual currency is the variable deposit in the virtual currency integration exchange server 100. On the other hand, when the value obtained by subtracting the average buying amount from the average selling amount decreases during the predetermined period, because the value of one unit of the corresponding virtual currency increases during a predetermined period, the respective broker member server 200 may determine that less virtual currency than the existing virtual currency is the variable deposit.

In particular, when the average buying amount is higher than the average selling amount during the predetermined period (in other words, when a value obtained by subtracting the average buying amount from the average selling amount is negative), because the value of each unit of the corresponding virtual currency continuously increases during the predetermined period, the virtual currency integration exchange server 100 may allow the broker member server 200 to deposit only the default deposit for the corresponding virtual currency without a variable deposit; alternatively, when the corresponding virtual currency is deposited in the default deposit, the virtual currency integration exchange server 100 may deduct (discount) the default deposit by the corresponding amount based on the average amount of deductions to deposit the deducted amount.

In other words, when the liquidation deposit is determined by specifying the amount of virtual currency because the price of the virtual currency is changed continuously, the continuous fluctuation of the monetary value of one unit of the virtual currency may not be reflected, and thus the default deposit and the variable deposit reflecting the trend of price fluctuations in the corresponding virtual currency may be deposited together.

The virtual currency integration exchange server 100 may detect a liquidation risk situation based on the buying request information and the selling request information.

According to an embodiment of the inventive concept, the liquidation risk situation may mean a risk situation where the liquidation process or the payment process may not be performed properly.

According to an embodiment of the inventive concept, the liquidation risk situation may include the case where the difference between the buying amount and the selling amount is excessively large.

According to an embodiment of the inventive concept, the liquidation risk situation may include the case where the request for buying virtual currency, of which the amount excessively exceeds the amount of virtual currency owned by the broker member server, is transmitted through a specific user terminal.

According to an embodiment of the inventive concept, the liquidation risk situation may include a credit risk situation; the credit risk situation may mean a situation where there is a high risk that a payment is not made from the broker member server of the other side of the concluded transaction.

According to an embodiment of the inventive concept, the liquidation risk situation may include a liquidity risk situation; the liquidity risk situation may mean a risk situation associated with the securitization of the security deposited in advance by the broker member server when a payment is not made from the broker member server.

According to an embodiment of the inventive concept, the liquidation risk situation may include a market risk situation; the market risk situation may mean a risk situation that may occur due to the price change of a market; in particular, when the portfolio associated with the broker member server for which a payment is not made is cleaned up, the market risk situation may occur as a market factor changes in an unfavorable direction.

According to an embodiment of the inventive concept, the liquidation risk situation may include a time-point risk situation; the time-point risk situation may mean a risk situation that may occur due to a difference in a payment point in time between a customer participating in a transaction and a broker member server.

According to an embodiment of the inventive concept, the liquidation risk situation may include an operational risk situation; the operational risk situation may include the loss risk according to the failure and error of overall computing systems used to trade virtual currency, the lack or failure of internal control, and the mistake and failure of employees.

However, the type of the liquidation risk situation may include a variety of unpredictable exceptional situations in each of which the liquidation process or the payment process may not be performed correctly, as the exemplary description.

Moreover, according to an embodiment of the inventive concept, the virtual currency integration exchange server 100 may analyze the buying request information and the selling request information, may detect whether the difference between the buying amount and the selling amount exceeds a predetermined level, and may determine whether the current situation corresponds to the liquidation risk situation.

In addition, according to an embodiment of the inventive concept, the virtual currency integration exchange server 100 may monitor the transaction reliability, the frequency of the fulfillment of a benefit in return, or the like of the customers associated with the broker member server 200 and may determine whether the current situation corresponds to the credit risk situation.

Moreover, according to an embodiment of the inventive concept, the virtual currency integration exchange server 100 may analyze the price flow, the trend of buying or selling amounts, transaction conclusion information, or the like for each virtual currency type and may determine whether the current situation corresponds to the liquidity risk situation, the market risk situation or the time-point risk situation.

Furthermore, according to an embodiment of the inventive concept, the virtual currency integration exchange server 100 may monitor the computer system, the customer management system, or the like of the broker member server 200 to determine whether the current situation corresponds to the operational risk situation.

Also, the virtual currency integration exchange server 100 may transmit a preliminary liquidation notification signal to the broker member server 200 when the current situation corresponds to the liquidation risk situation.

According to an embodiment of the inventive concept, the preliminary liquidation notification signal may be transmitted using various transfer means such as a text message, a mail, a page of an administrator, and the like.

Furthermore, the broker member server 200 may transmit a preliminary liquidation request signal to the virtual currency integration exchange server 100 in response to the preliminary liquidation notification signal.

Moreover, when the virtual currency integration exchange server 100 receives the preliminary liquidation request signal, the virtual currency integration exchange server 100 may complete the liquidation process between the virtual currency integration exchange server and the broker member servers 200 and 201 first and then may proceed with the payment process between the broker member servers 200 and 201 and the user terminal 40.

For example, in a payment risk situation where the request (at the conclusion) for buying virtual currency, of which the amount excessively exceeds the amount of virtual currency owned by the broker member servers 200 and 201, is generated, when the preliminary liquidation notification signal transmission by the virtual currency integration exchange server 100 and the preliminary liquidation request by broker member servers 200 and 201 are performed sequentially, the liquidation process in which the virtual currency integration exchange server 100 provides the broker member server 200 with the shortfall excluding the amount of virtual currency owned by the broker member server from a buying request amount between the virtual currency integration exchange server 100 and the broker member server 200 making a request for the corresponding preliminary liquidation and the broker member server 200 pays the charge corresponding to the shortfall to the virtual currency integration exchange server 100 is completed prior to the payment process, and after the liquidation process is completed, a payment process between the broker member server 200 and the user terminal 40 corresponding to the buyer, in which the broker member server 200 delivers the virtual currency received from the virtual currency integration exchange server 100 to the buying requestor and receives the charge corresponding to the virtual currency may proceed.

According to an embodiment of the inventive concept, the virtual currency integration exchange may pay the liquidation deposit of the corresponding virtual currency deposited by the broker member server, depending on the preliminary liquidation request of the broker member server.

For example, as described above, when the request for buying virtual currency, of which the amount excessively exceeds the amount of virtual currency owned by the broker member server, is transmitted through a specific user terminal (when the transaction is made depending on to a buying request), as the broker member server 200 requests the virtual currency integration exchange server 100 to borrow virtual currency, the virtual currency integration exchange server 100 pays the shortfall, and the payment process between the user terminal making a request for the purchase and the broker member server may proceed; afterward, in the liquidation process, the settlement for the payment of the shortfall and fee payment may be performed between the virtual currency integration exchange server and the broker member server (main liquidation, making the liquidation after a payment). When the virtual currency integration exchange server 100 determines that the buying request (when the transaction is made) exceeds the amount of virtual currency owned by the broker member server 200 by a certain level or more to determine that the current situation corresponds to a liquidation risk situation, the liquidation process in which the payment of the shortfall of virtual currency, the charge, and fee payment may be performed between the virtual currency integration exchange server 100 and the broker member server 200 may be completed first, and afterward, the payment process between the broker member server 200 and the user terminal making a request for the purchase may be completed later (preliminary liquidation, making a payment after the liquidation).

That is, through the preliminary liquidation, when the payment process may not be performed smoothly or after the payment process between the broker member server and the user terminal is completed first without any action, in the liquidation risk situation where subsequent liquidation processes may not be performed smoothly, the liquidation process between the virtual currency integration exchange server and the broker member server associated with the liquidation risk situation may be performed first and then the subsequent payment processes may be performed safely.

Figure 3:
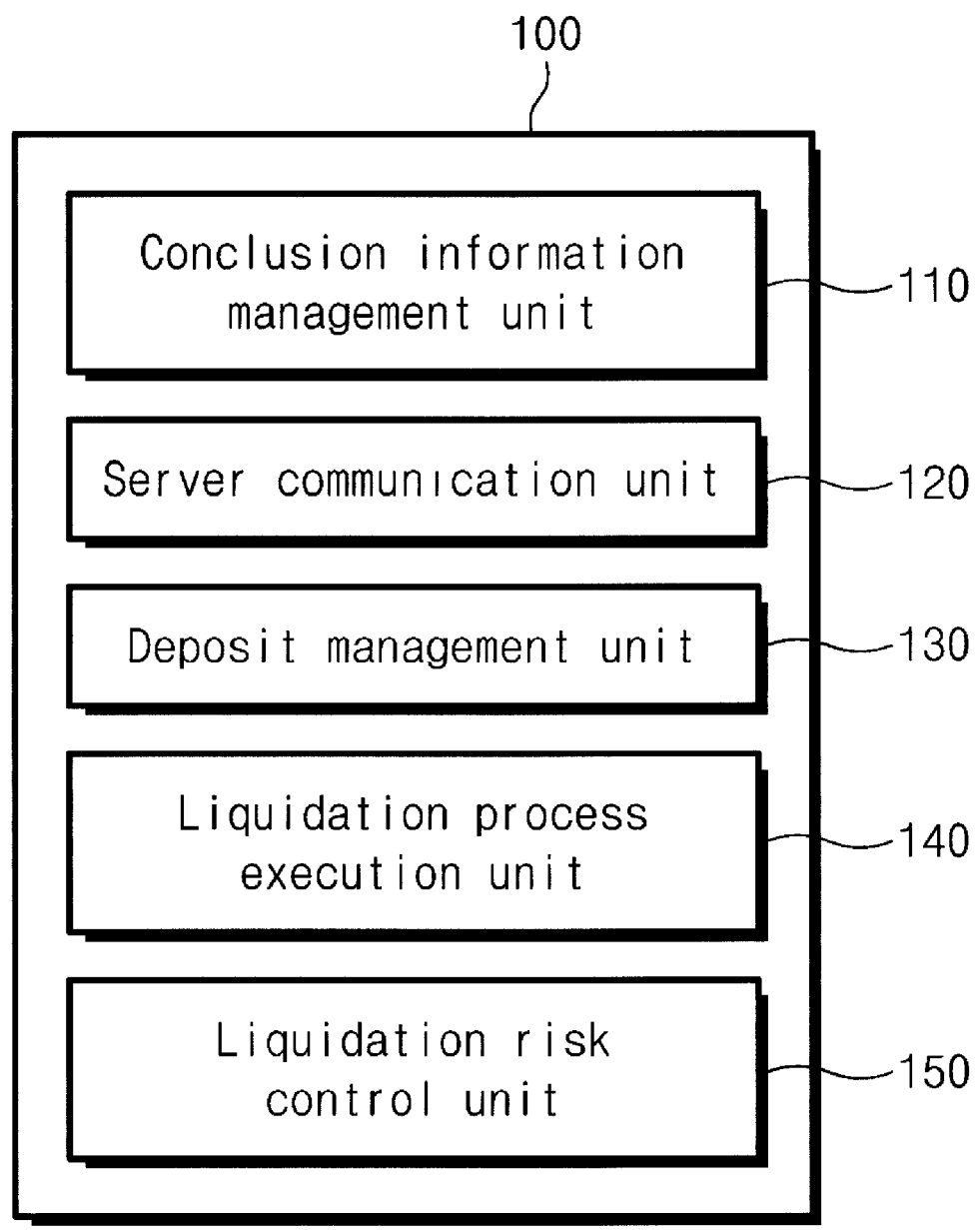
FIG. 3 is a diagram illustrating the configuration of a virtual currency integration exchange server, according to an embodiment of the inventive concept.

FIG. 3 is a diagram illustrating the configuration of a virtual currency integration exchange server, according to an embodiment of the inventive concept.

The virtual currency integration exchange server 100 described later has technical characteristics the same as or equivalent to the virtual currency integration exchange server 100 described in the virtual currency transaction system 10 according to an embodiment of the inventive concept described above, and thus the duplicate description will be briefly or omitted.

Referring to FIG. 3, the virtual currency integration exchange server 100 may include a conclusion information management unit 110, a server communication unit 120, a deposit management unit 130, a liquidation process execution unit 140, and a liquidation risk control unit 150.

The conclusion information management unit 110 may receive buying request information and selling request information, which are transmitted from the user terminal 40 to the broker member server 200, from the broker member server, may match the buying request information and the selling request information, which are suitable for a transaction condition, based on asking price information, and may generate and record transaction conclusion information based on the matching.

According to an embodiment of the inventive concept, the virtual currency integration exchange server 100 may make internal and external transactions; the internal transaction may be the transaction between user terminals associated with the same broker member server, and the external transaction may be the transaction between user terminals, which are respectively associated with different broker member servers.

Furthermore, according to an embodiment of the inventive concept, the conclusion information management unit 110 may preferentially match the conclusion of the internal transaction among pieces of buying request information and pieces of selling request information.

According to an embodiment of the inventive concept, the conclusion information management unit 110 may collect transaction conclusion information for each virtual currency transaction to transmit the collected transaction conclusion information to the blockchain network 300 and then may allow virtual currency changes in each of the broker member servers 200 to be updated. At this time, the transaction conclusion information for each virtual currency transaction may include a type of virtual currency being the target of a transaction, the matched buying request information and the matched selling request information, withdrawal details, and deposit details.

The server communication unit 120 may transmit the transaction conclusion information to a broker member server linked to the matched buying request information and selling request information, over a network interconnected to the broker member server.

According to an embodiment of the inventive concept, the server communication unit 120 may utilize the communication channel encrypted through the VPN and heart beat communication, over the network.

Moreover, according to an embodiment of the inventive concept, the transaction conclusion information may be transmitted and received in the form of a broadcast message composed of communication packets, which is implemented in the form of transaction processing through the protocol definition for communication.

The deposit management unit 130 may determine a liquidation deposit so as to ensure fulfillment of a liquidation process and may store information about a liquidation deposit that each of the plurality of broker member servers deposits for each virtual currency type.

According to an embodiment of the inventive concept, the deposit management unit 130 may store information about a liquidation deposit deposited for each of the plurality of broker member servers so as to ensure the fulfillment of the liquidation process.

Moreover, according to an embodiment of the inventive concept, the deposit management unit 130 may determine the liquidation deposit for each broker member server; the liquidation deposit may be determined for each type of virtual currency (e.g., Bitcoin, Ethereum, Ripple, or the like) that is the target of the transaction. The type of virtual currency may include virtual currency, a token, a coin, or the like, which is newly issued or is generated, as well as entire virtual currencies that are currently traded on the market.

Moreover, according to an embodiment of the inventive concept, the liquidation deposit may include a default deposit and a variable deposit; the default deposit may be determined based on the predetermined condition for fiat currency or at least one or more types of virtual currency; the variable deposit may be determined based on the average amount of deductions for each virtual currency type during a predetermined period.

The liquidation process execution unit 140 may collect the transaction conclusion information for all the plurality of broker member servers to conform a bond and a debt by deducting the bond and the debt and may process deposit/withdrawal of a cash account and a virtual currency account between the virtual currency integration exchange server and a respective broker member server based on the confirmed bond and debt.

According to an embodiment of the inventive concept, the liquidation process may mean a series of procedures of intervening in all virtual currency transactions between all user terminals linked to the plurality of broker member servers, becoming a buyer for all sellers and becoming a seller for all buyers, deducting bonds and debts for each of the broker member servers to confirm the bonds and debts and guaranteeing payment fulfillment.

Moreover, according to an embodiment of the inventive concept, the first required period of a payment process that is a deposit/withdrawal procedure based on the transaction conclusion information between the broker member server and the user terminal may be different from the second required period of a liquidation process between the virtual currency integration exchange server and the broker member server.

According to an embodiment of the inventive concept, the payment process may mean a process in which the broker member server 200 change the possession details of the cash account and virtual currency account of a buyer and a seller participating in the transaction concluded by the virtual currency integration exchange server 100.

Moreover, according to an embodiment of the inventive concept, the first required period of the payment process may be longer than the second required period of the liquidation process.

Moreover, according to an embodiment of the inventive concept, for example, the first required period of the payment process may be the day on which the corresponding transaction is made; in this case, the second required period of the liquidation process may be the next day of the date on which the corresponding transaction is made.

The liquidation risk control unit 150 may detect a liquidation risk situation based on buying request information and selling request information of virtual currency received from a plurality of broker member servers and may transmit a preliminary liquidation notification signal to a corresponding broker member server when the liquidation risk situation is detected.

Furthermore, when the broker member server transmits a preliminary liquidation request signal to the liquidation risk control unit in response to the preliminary liquidation notification signal, the liquidation process execution unit 140 may complete a liquidation process between the virtual currency integration exchange server and the broker member server first before a payment process between the broker member server and the user terminal is performed.

Figure 4A:
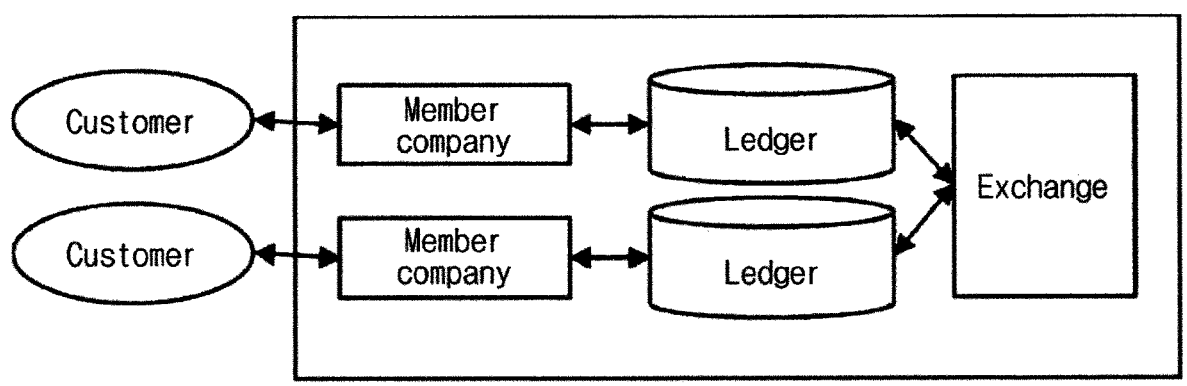
FIGS. 4A and 4B are views for describing a type of broker member server of a virtual currency transaction system according to an embodiment of the inventive concept.
Figure 4B:
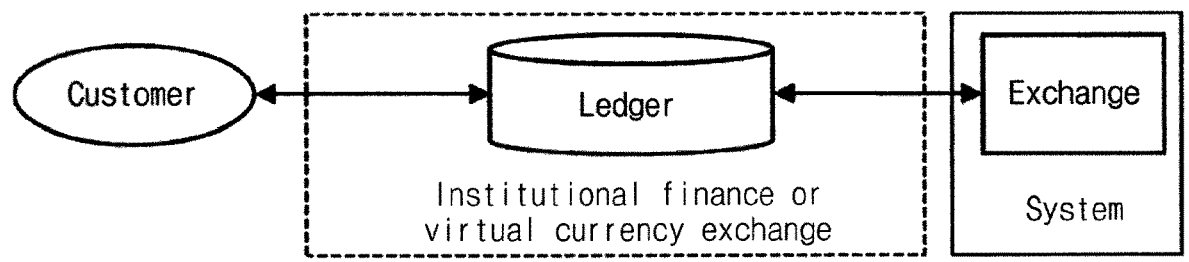

FIGS. 4A and 4B are views for describing a type of broker member server of a virtual currency transaction system according to an embodiment of the inventive concept.

Referring to FIGS. 4A and 4B, the broker member server 200 may include a platform member broker member server (4A) or an exchange member broker member server (4B).

The platform member broker member server may use the same system or platform as the virtual currency integration exchange server 100 with respect to a matching module, a ledger, and channel for the virtual currency transaction.

The exchange member broker member server may be an institutional finance or another virtual currency exchange; while using the system of the exchange member broker member server with respect to the ledger for a virtual currency transaction, the exchange member broker member server may use the same method as the virtual currency integration exchange server with respect to only the matching module for sharing asking price between broker member servers.

The above-mentioned description of the inventive concept is intended to be illustrative, and it should be understood by those skilled in the art that the inventive concept may be embodied in other specific forms without departing from the spirit or essential characteristics thereof. Therefore, the above-described embodiments are exemplary in all aspects, and should be construed not to be restrictive. For example, each component described in a single type may be implemented in a distributed manner, and similarly, components described as being distributed may be implemented in a combined form.

The scope of the inventive concept is defined by claims to be described rather than the detailed description, and it should be interpreted that the scopes or claims of the inventive concept and all modifications or changed forms derived from the equivalent concept are included in the scopes of the inventive concept.

According to the above-mentioned solution means according to an embodiment of the inventive concept, it is possible to provide a virtual currency transaction system that may secure the diversity of virtual currency transactions through virtual currency transactions between different virtual currency transaction exchanges and may intervene in the entire transactions by introducing a virtual currency integration exchange that integrally manages a plurality of virtual currency transaction exchanges, thereby ensuring the completeness of a transaction.

According to the above-mentioned solution means according to an embodiment of the inventive concept, it is possible to provide a liquidation deposit system that may ensure the fulfillment of a payment between a virtual currency integration exchange and a plurality of virtual currency transaction exchanges (a plurality of member companies) and may allow virtual currency transactions capable of being trusted by a user employing the virtual currency transaction system to be made, and a virtual currency transaction system including a preliminary liquidation system.

However, the effects obtainable from the inventive concept are not limited to the effects as described above, and other effects may be present.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A virtual currency integration exchange server, the server comprising:
    a conclusion information management unit, wherein the conclusion information management unit is configured to:
        receive buying request information and selling request information from a plurality of broker member servers, the buying and selling request information being transmitted from user terminals to the plurality of broker member servers;
        match the buying request information and the selling request information, which are suitable for a transaction condition, based on asking price information; and
        generate and record transaction conclusion information based on the matching;
    a server communication unit configured to transmit the transaction conclusion information to at least one broker member server among the plurality of broker member servers over a network interconnected to the at least one broker member server, the at least one broker member server being associated with the matched buying request information and selling request information;
    a deposit management unit, wherein the deposit management unit is configured to:
        determine a liquidation deposit so as to ensure fulfillment of a liquidation process; and
        store information about a liquidation deposit deposited by each of the plurality of broker member servers for each virtual currency type;
    a liquidation process execution unit, wherein the liquidation process execution unit is configured to:
        collect the transaction conclusion information associated with the at least one broker member server to confirm a bond and a debt by deducting the bond and the debt; and
        process deposit/withdrawal of a cash account and a virtual currency account between the virtual currency integration exchange server and each of the at least ones broker member server based on the confirmed bond and the confirmed debt; and
    a liquidation risk control unit, wherein the liquidation risk control unit is configured to:
        detect a liquidation risk situation based on the buying request information and the selling request information of virtual currency received from the at least one broker member server; and transmit a preliminary liquidation notification signal to the at least one broker member server when the liquidation risk situation is detected, wherein the liquidation process execution unit is further configured to:

when the at least one broker member server transmits a preliminary liquidation request signal to the liquidation risk control unit in response to the preliminary liquidation notification signal, complete the liquidation process between the virtual currency integration exchange server and the at least one broker member server first before a payment process between the at least one broker member server and at least one user terminal among the user terminals is performed, wherein a first required period of a payment process that is a deposit/withdrawal procedure based on the transaction conclusion information between the at least one broker member server and the at least one user terminal is different from a second required period of a liquidation process between the virtual currency integration exchange server and the at least one broker member server, wherein a transmission-reception channel of a price information and a transmission-reception channel of a trading information are separately set and used in a dedicated network by the at least one broker member server, wherein the virtual currency integration exchange server is configured to:

transmit a trading price information including asking price of the virtual currency in a predetermined format to the at least one broker member server through a first channel of the dedicated network; and receive the buying request information or the selling request information in a predetermined format from the at least one broker member server through a second channel of the dedicated network.

* * * * *